Sept. 2, 1958 M. C. HEIDTMAN, JR 2,849,900
PORTABLE FRAME FOR POWER HAND DRILLS
Filed Nov. 2, 1954 2 Sheets-Sheet 1
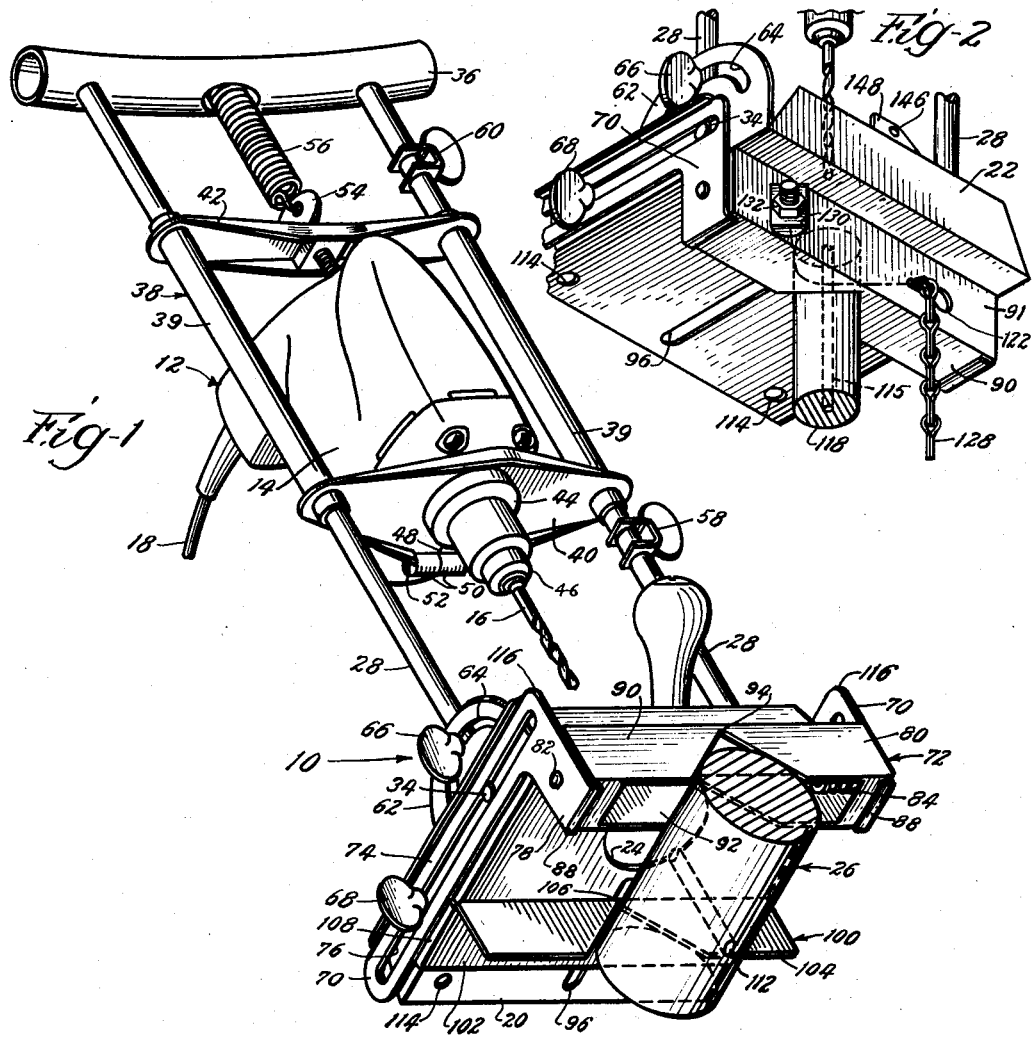
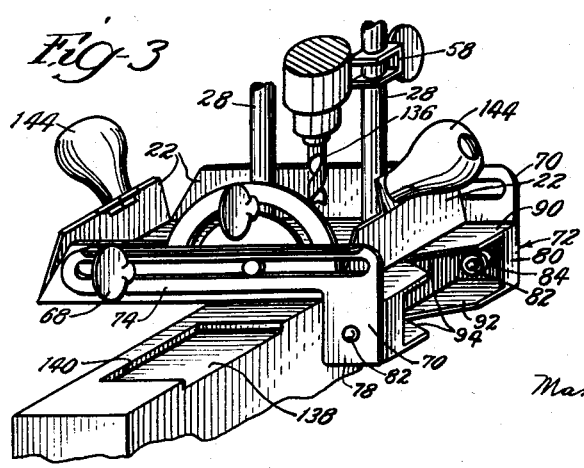
Inventor
Martin C. Heidtman Jr.
By:-
Mann, Brown and Hansmann
Attys.

Sept. 2, 1958　　　M. C. HEIDTMAN, JR　　　2,849,900
PORTABLE FRAME FOR POWER HAND DRILLS
Filed Nov. 2, 1954　　　　　　　　　　2 Sheets-Sheet 2
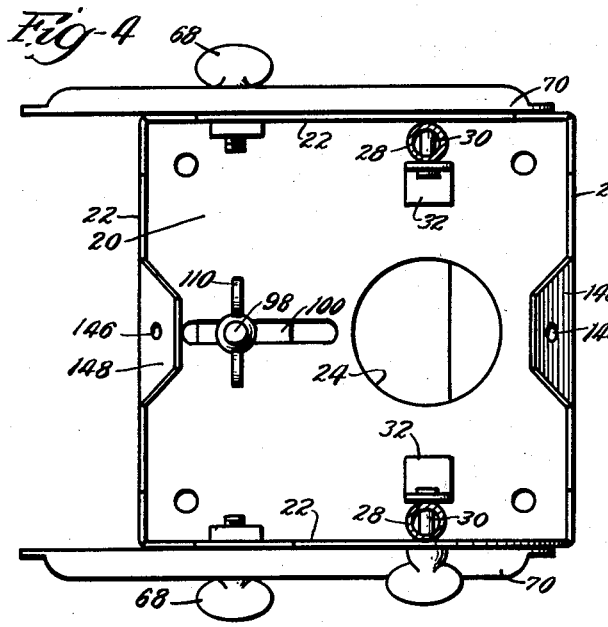
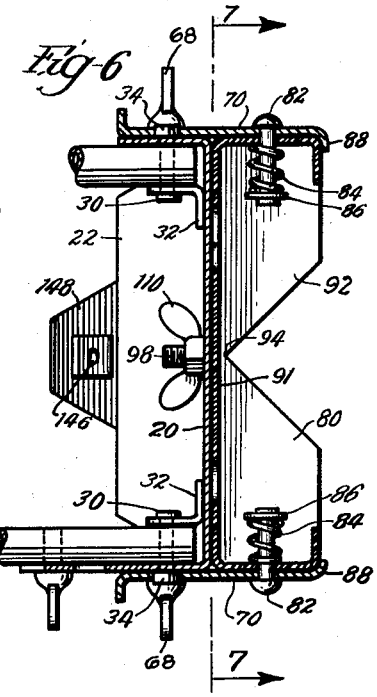
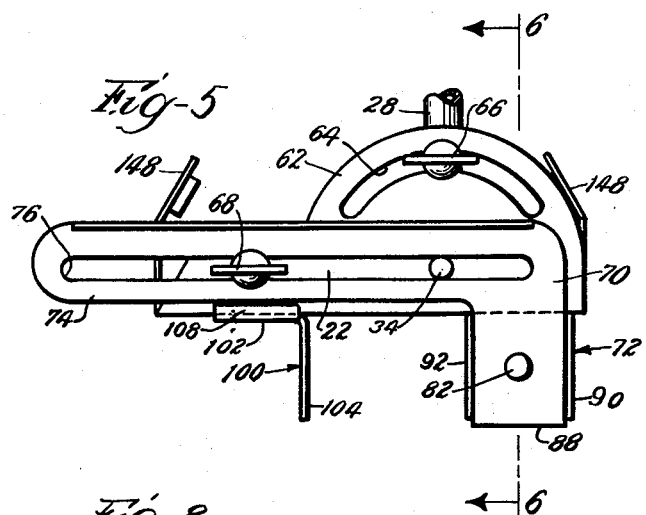
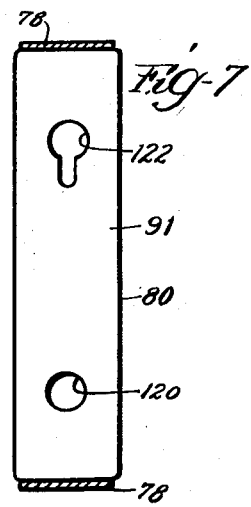
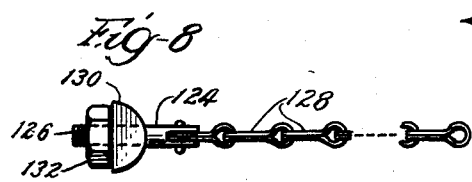
Inventor.
Martin C. Heidtman Jr.
By:-
Mann, Brown and Hansmann
Attys.

United States Patent Office 2,849,900
Patented Sept. 2, 1958

2,849,900

PORTABLE FRAME FOR POWER HAND DRILLS

Martin C. Heidtman, Jr., Hammond, Ind.

Application November 2, 1954, Serial No. 466,270

8 Claims. (Cl. 77—14)

My invention relates to a portable frame for power hand drills, and more particularly, to a portable frame in which a power hand drill may be securely mounted and accurately positioned adjacent a piece of work for drilling a hole therein, for performing a routing operation thereon, or for performing other operations in which a drill may be employed.

Conventional power hand drills are inherently relatively awkward tools to handle and it has been difficult in the past to accurately drill holes in or through, for instance, round stock for the reason that as the bit turns against the stock the hand drill is pushed away from the work by the rotating bit; moreover the drill is hard to hold steady as the drill bit progresses inwardly through the work. Thus, in tubular stock, after the bit has passed through one side thereof, heretofore it has been practically impossible to accurately drill the hole in the other side of the stock where one desires to provide a radial hole through the stock without rigid immovable supports engaging the hand drill. A number of different types of supporting frames have been developed in the past to aid the operator in handling a hand drill, but these in the main have proved unsatisfactory due to the fact that they are overly bulky, tend to greatly restrict the maneuverability of the hand drill, are expensive to manufacture and in many cases have limited usefulness or application.

It is a primary object of this invention to provide an improved portable frame for power hand drills which allows the operator to perform a wide variety of drilling operations, which is extremely light and easy to handle, and which may be used with accuracy heretofore impossible in devices of this type.

It is another object of the invention to provide several forms of work-engaging attachments for use with portable frames of the type herein described which serve as guiding and work locating or indexing means for properly positioning the device with respect to the work and which materially aid in allowing even the novice to perform with facility what were formerly relatively difficult drilling operations.

Another important object of the invention is to provide a portable frame for power hand drills which allows the operator to perform many of the routing operations formerly possible only when using one of the relatively expensive conventional routing machines.

Other objects and advantages of the present invention will become apparent in the following description of a preferred embodiment of the portable frame for electric hand drills comprising the present invention, and a manner or manners of using same.

In the drawings:

Figure 1 is a perspective view of the device shown applied to round bar stock and being positioned for drilling a hole radially of the bar stock;

Figure 2 is a perspective view of the device of Figure 1, with parts broken away, showing the device applied to round bar stock for drilling axially of the stock;

Figure 3 is a perspective view of the device of Figure 1 shown employed in a typical router job, as for instance, forming a recess for a butt hinge in a door;

Figure 4 is an upper plan view of the base, parts being shown in section;

Figure 5 is a side view of the base shown in Figure 4;

Figure 6 is a cross-sectional view along line 6—6 of Figure 5;

Figure 7 is a cross-sectional view along line 7—7 of Figure 6; and

Figure 8 is a plan view of the clamping chain and associated elements shown in Figure 2.

Referring more particularly to Figure 1 of the drawings, reference numeral 10 generally indicates the improved portable frame having applied thereto a conventional hand drill 12 having a housing 14, a bit 16 and a cord 18 leading to a conventional source of electrical energy. The frame 10 comprises a generally flat base 20 formed with upstanding sides 22 and having a generally round clearance hole 24 formed therein for passage therethrough of the drill bit 16 into the work 26, which is shown diagrammatically in Figure 1, for illustrative purposes only, as being a length of solid round stock. Pivoted adjacent the sides of the hole, and aligned with the axial center thereof are a pair of rigid rods 28; as shown in Figures 4 and 6, the rods in the illustrated embodiment are secured to the base by pins 30 mounted between brackets 32 and an adjacent side 22, said pins having outwardly-extending portions 34 for a purpose hereinafter made clear. The rods 28 are joined together by a rigid handle bar 36 and carry thereon a slidable carrier frame generally indicated at 38. The carrier frame 38 comprises a pair of tubular sliding members 39 secured together at the ends thereof by a pair of spanning bars or yokes 40 and 42. The bottom spanning bar or yoke 40 is provided with a hole 44 at the center thereof to receive the drill chuck 46. If desired, one side of the bar may be split, as at 48, and the depending flanges 50 thereof curled and screw-threaded to receive the clamp screw 52 whereby the lower yoke may be arranged to clampingly engage the hand drill; I have found, however, that under ordinary circumstances the clamping structure of yoke 40 may be replaced by a solid yoke perforated as at 44. The upper yoke 42 carries a clamp screw 54 at the center thereof which is adapted to engage a conventional centering hole (not shown) in the rear of the hand drill. A tension spring 56 extends between the handle bar 36 and the screw 54 for biasing the carrier frame 38 away from the base 20. Either one or both of the rods 28 may be provided with thumbscrew locking stops 58 and 60 for purposes hereinafter made clear. One of the sides 22 may be formed with an arcuate portion 62 having an arcuate slot 64 formed therein in which thumbscrew 66 carried by the rod 28 may be adjusted to provide the desired inclination of the carrier frame 38, and thus, the hand drill, with respect to the base 20.

Slidably mounted on two opposite sides 22 of the base 20 by the outwardly extending ends 34 of pins 30 and the thumbscrews 68 carried thereby are the L-shaped arms 70 of the combination guide and indexing attachment 72. The longer lengths 74 of the L-shaped arms are formed with longitudinally-extending slots 76 which slidably receive the ends 34 of pins 30 and the clamping screws 68 carried in sides 22; the shorter lengths 78 thereof have pivoted therebetween a generally channel-shaped indexing member 80. Referring to Figure 6, the member 80 is pivoted between the arms 70 by relatively long pins 82 having spring means 84 positioned thereon between the inside surfaces of the member 80 and abutments 86 carried by the ends of the pins 82. The ends of the shorter lengths 78 are preferably formed with inwardly curved or projecting lips 88 which are adapted to engage the sides of the member 80 substantially as shown in Figure 6. The member 80 includes plane sides 90, 91 and 92, with the sides 90 and 92 being formed with a V slot having the apexes 94 thereof aligned with the center of the hole 24.

The base 20 may also be slotted at 96 for slidably receiving the screw-threaded stud 98 of auxiliary guide and indexing member 100 comprising an angle member having a portion 102 thereof abutting the bottom surface of the base 20 and a depending flange 104 formed with a V slot having the apex 106 thereof aligned with the apexes 94 and the center of hole 24. The outer ends of the member 100 may be turned upwardly as at 108 to slidingly engage the sides 22 of the base 20. Thumbscrew 110 clampingly secures the auxiliary member 100 to the base 20.

In using the device as thus far described, and with the elements thereof positioned as shown in Figure 1, the base 20 including the attachments 72 and 100 is placed against the round bar stock 26, it being assumed that one desires to drill a radial hole through the bar stock. The V slots will automatically align the axis of the stock 26 with the center of the hole 24, it being understood that the carrier frame is positioned by adjusting screw 66 in slot 64 so that the center line of the drill bit is aligned with the center of hole 24. One then lowers the adjustable stop 58 sufficiently to allow the bit to pass through the stock 26, actuates the hand drill, and urges the drill downwardly against the tension of spring 56. The bit 16 will thereupon pass through the center of hole 24, into the stock 26, through the axial center of stock 26 and outwardly of the stock, and by releasing the hand drill, spring 56 pulls the drill and bit back up to the position shown in Figure 1, leaving the hole indicated at 112. It will be appreciated that the spacing between attachments 72 and 100, as well as between these attachments and the hole 24, may be varied as desired by merely loosening the thumbscrews 68 and/or 110, positioning the respective attachments as desired, and retightening the said thumbscrews.

Where one desires to drill a radial hole adjacent the end of a length of stock insufficiently long to span the distance between the two attachment devices, the attachment 72 may alone be used and the attachment 100 either ignored or removed as desired. In using the frame 10 on such length of stock, the member 80 may be positioned so that the side 92 thereof is closely adjacent the center of hole 24 and the frame 10 including the hand drill is positioned against the stock. The two V slots in sides 90 and 92 accurately index or locate or position the frame with respect to the work so that the bit will pass through the axial center of the stock. In this manner, a hole 112 may be drilled as close to the end of the stock as desired.

It will also be appreciated that the attachments 72 and 100 may be removed entirely when it is desired to use the hand drill for drilling holes in flat work, and also, that the rods 28 may be inclined as desired by merely adjusting the screw 66 whereby inclined holes may be drilled in both round (when employing the attachments 72 and 100, either singly or in combination) and flat stock. Holes 114 may be provided for securing other attachments to the base or for attaching the base to a fixed supporting surface as desired.

The adjustable stop 58 may be employed to enable one to drill a plurality of holes of equal depth. Thus, with the adjustable stop 58 loose on the rod 28, the bit is passed through the hole 24 to the desired depth, and the stop 58 is then clamped. One then applies the drill to the work, and when the lower spanning member or yoke 40 contacts the stop 58 the desired depth of hole has been reached.

The spring 56 has two important functions in the device as illustrated in Figure 1. It not only acts to urge the hand drill upwardly of, or away from the base, but it also prevents the clamp screw from turning loose when the drill is in operation; this is because the upward force of the spring acting on the screw 54 resists twisting of the screw. I comprehend that springs 56 of varying strength may be employed with hand drills of varying size and weight, and that suitable power means, hand-operated or otherwise, may be employed to urge the drill bit into the work against the tension of a relatively strong spring 56.

In Figure 2, I illustrate the frame 10 as applied to the end of a piece of bar stock 118 for drilling an axial hole 115 therein. It will be noted that the side 92 of the member 80 is shown flush against the bottom surface of the base 20, and the side 90 faces downwardly. The member 80 may be positioned in this manner from the position shown in Figure 1 by loosening the screws 68, urging the right-angled ends of the L-shaped arms outwardly of the base 20 so that ends 34 of pins 30 are disengaged from the slots 76 and moving the shorter lengths 78 of the L-shaped arms downwardly or away from the bottom 20, pivoting the attachment 72 as a whole about the screws 68. The L-shaped arms then may be grasped by the fingers of one hand at the right-angled corners 116 and pressed toward each other; the shorter lengths 78 of the L-shaped arms will then tend to move outwardly of the member 80 against the action of compression springs 84. When the lips 88 have become disengaged from the member 80, the member 80 may be rotated or pivoted about the pins 82 to the position desired, for instance, the position of Figure 2. The corners 116 are then released, whereupon the springs 84 urge the lips 88 back into engagement with the member 80; the ends 34 of pins 30 are then reinserted in the slots 76. It will be noted that when the attachment 72 is secured as shown in Figures 1 and 2, with the member 80 positioned inwardly of the outer edge of the base 20, the member 80 is restrained from turning not only by the lips 88, but also by the bottom surface of the base. This provides a very secure mounting of the member 80, although the action of lips 88 is sufficient by itself for most work.

Alternately, the member 80 may be changed from the position shown in Fig. 1 by removing the screws 68 and then urging the two arms 70 apart from the base 20 against the pressure from springs 84 until the slots 76 are disengaged from the pin ends 34. The member 80 of attachment 70 may then be changed with respect to the arms 70 by simply grasping the member 80 in one hand and twisting the arms 70 in the desired direction about the axis of pins 82. This twisting action compresses the springs 84, allowing lips 88 to slip to the next succeeding surface whereupon the springs 84 urge these lips back into engagement with the member 80. The slots 76 of arms 70 are then re-engaged with the ends 34 of pins 30 and the screws 68 replaced.

Referring again to Figure 2, I provide means for clamping the end of the normally disposed piece of round stock 118 against the V slots of member 80. As shown in Figure 7, the side 91 of member 80 is formed with a substantially round hole 120 and a keyhole slot 122. A pin 124 having a screw-threaded end 126, which pivotally carries the end of a short length of chain or the like 128, is received in the hole 120, and a rocker seat 130 comprising, in the illustrated embodiment, one-half of a short length of round stock, is received on the outwardly-extending end of the pin. A screw-threaded nut 132 is received on end 126 of the pin, and the other end of the chain is passed around the stock 118 and out through the keyhole slot 122. A conveniently placed link of the chain 128 is positioned in the narrow portion of the keyhole slot 122, and the nut 132 is tightened against the rocker seat 130 to secure the end of the stock 118 tightly against and within the V slots of member 80. It will be appreciated that the rocker seat 130, chain 128, and the keyhole slot allows one to secure stock of relatively large or small diameter against the member 80 and that the rocker seat automatically positions itself so that the pin 124 and the end of the chain adjacent the pin will always be aligned regardless of the size of bar stock to be drilled. I comprehend that other types of rocker seats 130 may be employed, as for instance, the rocker seat may have a hemispherical configuration if so desired.

When the stock 118 is clamped against the member 80 and the attachment 72 is positioned with respect to the base 20 so that axial hole 115 may be drilled where desired in the end of the stock, as for instance, either at the axial center thereof, or at a point spaced from the center, the hand drill may be actuated as above described to drill the hole, either to a desired depth as measured by the predetermined positioning of the adjustable stop 58, or otherwise.

It will be appreciated that the auxiliary attachment 100 may be left in place or removed as desired when drilling axial holes in stock 118, and I comprehend that it may be used to fix the stock against the V slots of member 80 where the dimensions of the stock and the drilling operation to be performed permit such use. Additionally, the flange 104 of the auxiliary attachment may be replaced by a plane unslotted member for this purpose. When using the frame 10 for other operations described herein the chain 128 will ordinarily be removed to allow the flat outer face of side 91 of member 80 to be used to full advantage.

Referring now to Figure 3, the frame 10 is shown having been applied to the edge of a door for a routing operation therein to apply, for instance, the butt end of a door hinge thereto. For the routing operation, the member 80 may be rotated or pivoted as described above to position the side 91 thereof adjacent the hole 24 and the side 90 in engagement with, or substantially level with, the bottom surface of the base 20. A conventional router bit 136 is then placed in the drill chuck, and the attachment clamped in position to provide a desired width of hole 138. This position may be determined by making the distance between the outer face of side 91 and the farthest side of router bit equal to the desired width of the hole 138. The adjustable stop 60 may be positioned to hold the hand drill against the action of spring 56 so that the drill bit extends through the hole 24 a desired distance, that is, the desired depth of the hole 138. The frame is then moved back and forth across the edge of the door with the router bit performing its conventional function when the drill is actuated. The hole 138, if it is to be at all deep, should be formed by removing a series of layers by suitably adjusting the stop 60 for routing a permissible depth or adjusting stop 58 to the final depth required and plunging the router down and up while progressing along the work until the desired hole is formed. The outer face of the side 91 of member 80 defines the inner wall 140 of the hole 138. If it is desired to form the hole 138 within both sides of the edge of the door, auxiliary attachment 100 may be employed to stop movement of the frame 10 at the desired point. The corners of the hole 138 may be readily squared off with a conventional wood chisel or the like after the hole has been routed to the desired depth.

I have found that not only does my portable frame allow one to perform most of the routing operations heretofore only possible with expensive machines constructed especially for routing work, but it allows one to work faster and yet provides comparable results. Moreover, if one desires to form a slanted slot or recess, it is possible to do this by merely inclining the carrier frame 38 to the desired angle; it is not possible to do this latter type of work with conventional routers since they are provided with vertical (as distinguished from angular) adjustment only.

The various elements of the frame 10 may be formed out of any suitable materials, though I prefer to form the base and attachments therefor out of light gauge sheet metal, though these elements could be formed of cast aluminum or the like. I have found it convenient to attach handles 144 where shown in Figures 1 and 3, holes 146 (see Figures 2 and 4) being provided in flanges 148 of opposed sides 22 for this purpose.

The foregoing description and the drawings are given merely to explain and illustrate my invention, and the invention is not be limited thereto, except insofar as the appended claims are so limited since those skilled in the art who have my disclosure before them will be able to make modifications and variations therein without departing from the scope of the invention.

I claim:

1. A portable frame for a power hand drill including a bit for application to a piece of work, said frame comprising a base, a carrier frame adjustably mounted on said base, said carrier frame being formed to receive the hand drill with the drill bit extending toward said base, said base being formed with a clearance hole for the passage of the drill bit there through and into engagement with a piece of work when the piece of work is positioned adjacent the underside of the base, a device carried by said frame for locating the piece of work with respect to said clearance hole, said device comprising an adjustable member mounted adjacent the underside of said base, said member being formed with means for locating a piece of work with respect to said clearance hole when the portable frame is applied to the piece of work, a pair of elongate arms slidably connected to the base, releasable means for locking said arms against sliding movement with respect to the base, means pivoting said member between said arms, said arms being formed with inwardly projecting lips for engagement with said member for preventing relative movement of said member with respect to said arms, said last mentioned means allowing outward movement of said arms away from said member at least the width of said lips to allow pivotal adjustment of said member with respect to said arms, and biasing means normally urging said arms into engagement with said member, said member slidably engaging the bottom of the base when said device is in assembled condition.

2. A portable frame for a power hand drill including a bit for application to a piece of work, said frame comprising a base, a carrier frame adjustably mounted on said base, said carrier frame being formed to receive the hand drill with the bit extending toward said base, said base being formed with a clearance hole for passage of the drill bit therethrough and into engagement with the piece of work when the piece of work is positioned adjacent the underside of said base, a device carried by said frame for locating the piece of work with respect to said clearance hole, said device comprising a first member mounted adjacent the underside of said base on one side of said clearance hole and a second member positioned on the other side of said clearance hole, said members being formed with means for positioning the piece of work with respect to the clearance hole when the portable frame is applied to the piece of work, said first member including a pair of L-shaped arms having their longer lengths slidably connected to said base, releasable means for locking said arms against sliding movement with respect to said base, means pivoting said first member between the shorter lengths of said arms, said shorter lengths of said arms being formed with inwardly projecting lips for engagement with said first member for preventing relative movement of said first member with respect to said arms, said last mentioned means allowing outward movement of said arms at least the width of said lips to allow pivotal adjustment of said first member with respect to said arms, and biasing means normally urging said arms into engagement with said first member, said first member slidably engaging the underside of said base when said device is in assembled condition, said second member being slidably mounted along the underside of said base and including means for releasably precluding sliding movement thereof.

3. A portable frame for a power hand drill including a bit for application to a piece of work, said frame comprising a relatively flat base, a pair of supporting rigid members pivoted to said base, a carrier frame slidably mounted on said rigid members, said base being formed with a clearance hole for passage of the drill bit therethrough and into engagement with the piece of work, said carrier frame being formed to receive the hand drill with the bit directed toward said clearance hole, a rigid bar connecting the outwardly extending ends of said rigid members, resilient means biasing said carrier frame away from said base, an adjustable member mounted adjacent the underside of said base, said member being formed with means for positioning the piece of work with respect to the clearance hole when said portable frame is applied to the piece of work, a pair of L-shaped arms having their longer lengths slidably connected to said base, releasable means for locking said arms against sliding movement with respect to said base, means pivoting said member between the shorter lengths of said arms, said shorter lengths of said arms being formed with inwardly projecting lips for engagement with said work engaging member for preventing relative movement therebetween, said last mentioned means allowing outward movement of said arms at least the width of said lips to allow pivotal adjustment of said work engaging member with respect to said arms, and biasing means normally urging said arms into engagement with said member.

4. The portable frame set forth in claim 3 including pins pivoting said rigid supporting members to opposed sides of said base on either side of said clearance hole and said longer lengths of said L-shaped arms being each formed with longitudinally extending slots, said pins extending into the respective slots, said releasable means being operable in said slots.

5. The portable frame set forth in claim 3 wherein said member is positioned on one side of said clearance hole, and wherein a second member is positioned on the other side of said clearance hole, said second member being slidably mounted on said base and including means for releasably precluding sliding movement thereof with respect to said base, said second member including means for locating the piece of work with respect to said clearance hole.

6. A portable frame for a power hand drill including a bit for application to a piece of work, said frame comprising a substantially flat base, a carrier frame adjustably mounted on said base, said carrier frame being formed to receive the hand drill with the bit extending toward said base, said base being formed with a clearance hole for passage of the drill bit therethrough and into engagement with a piece of work when the piece of work is positioned adjacent the underside of said base, a device carried by said frame for locating a piece of work with respect to said clearance hole, said device comprising an oblong element positioned adjacent said underside of said base, said element being formed with a plurality of plane surfaces extending the length thereof, one of said surfaces being formed with a V-shaped recess that is adapted to locate a piece of generally cylindrical work with respect to said clearance hole, and mounting elements slidably securing said element to said base for movement toward and away from said clearance hole, with the apex of said recess aligned with the center of said clearance hole, said element being pivotally secured to said mounting elements for pivotal movement with respect thereto about its longitudinally extending axis whereby said surfaces may be repositioned with respect to said clearance hole, releasable means for locking said mounting elements against movement with respect to said base, and means for releasably locking said element against pivotal movement with respect to said mounting elements.

7. A drill attachment for a power hand drill including a bit for application to a piece of work, said attachment comprising an adjustable member for engaging the piece of work, said member being positioned adjacent to the path of movement of the drill bit, said member being generally polygonal in cross sectional configuration with each side thereof being formed with means for locating the piece of work with respect to the drill bit when said member is positioned adjacent the piece of work, a pair of elongate arms slidably mounted in parallel relationship, releasable means for locking said arms against sliding movement with respect to the drill, said member being pivoted between said arms, said arms being formed with inwardly projecting lips for engagement with said member for preventing relative movement of said member with respect to said arms, said arms being secured to said member for movement toward and away from same at least the width of said lips to allow pivotal adjustment of said member with respect to said arms, and biasing means normally urging said arms into engagement with said member.

8. In a portable frame for a power hand drill including a bit for application to a piece of work, said frame comprising a substantially flat base, a carrier frame mounted on said base for movement toward and away from said base, said carrier frame being formed to receive the hand drill with the bit extending toward said base, said base being formed with a clearance hole for passage of the drill bit therethrough and into engagement with the piece of work when the piece of work is positioned adjacent the underside of said base, a device for locating the end of a piece of round stock with respect to the clearance hole and drill bit for drilling an axial hole therein, said device comprising a rigid element positioned adjacent the undersurface of said base, a pair of elongate arms slidably mounted in parallel relationship on said base, releasable locking means for releasably locking said arms against movement with respect to said base, said element being secured between said arms and including a V-shaped slot facing said clearance hole and adapted to engage the stock, said element being so positioned with respect to said clearance hole that the apex of said V-shaped slot is aligned with the center of said clearance hole in all positions of adjustment, said arms being mounted to provide adjustment of said element toward and away from said clearance hole when said releasable locking means is released, said element being formed with a keyhole slot on one side of said V-shaped slot and being perforated on the other side thereof, a screw-threaded pin passing through said perforation toward said clearance hole, a chain member connected to the inwardly extending end of said pin and extensible about said V-shaped slot and thence through said keyhole slot, a rigid member having a rounded surface received on said pin outwardly of said perforation and adapted to bear against said element, and screw-threaded means on the outward end of said pin and adapted to draw said pin outwardly of said perforation to tighten said chain member against the stock after the other end of said chain member has been positioned in said keyhole slot and around the end of the stock.

References Cited in the file of this patent

UNITED STATES PATENTS

| | | |
|---|---|---|
| 1,317,285 | Glaude | Sept. 30, 1919 |
| 1,470,143 | Buterbaugh | Oct. 9, 1923 |
| 1,971,650 | Furman et al. | Aug. 28, 1934 |
| 2,160,274 | Lopez | May 30, 1939 |